United States Patent
Chuang et al.

[11] Patent Number: 6,045,762
[45] Date of Patent: Apr. 4, 2000

[54] APPARATUS FOR CATALYTIC DISTILLATION

[75] Inventors: Karl Tze-Tang Chuang; Zhanping Xu, both of Edmonton, Canada

[73] Assignee: Governors of The University of Alberta, Edmonton, Canada

[21] Appl. No.: 08/787,355

[22] Filed: Jan. 22, 1997

[51] Int. Cl.[7] .............................. B01J 8/04; B01J 10/00; B01D 47/16
[52] U.S. Cl. ..................... 422/195; 261/97; 261/114.1
[58] Field of Search ................... 422/192, 193, 422/195, 191; 202/158; 203/29; 261/97, 114.1

[56] References Cited

U.S. PATENT DOCUMENTS

| | | | |
|---|---|---|---|
| 3,579,309 | 5/1971 | Sennewald et al. | 23/288 |
| 3,629,478 | 12/1971 | Haunschild | 260/677 |
| 3,634,535 | 1/1972 | Haunschild | 260/677 |
| 4,215,011 | 7/1980 | Smith | 252/426 |
| 4,439,350 | 3/1984 | Jones | 502/527 |
| 4,443,559 | 4/1984 | Smith | 502/527 |
| 4,536,373 | 8/1985 | Jones | 422/211 |
| 4,836,989 | 6/1989 | Aly et al. | 422/195 |
| 5,013,407 | 5/1991 | Nocca et al. | 202/158 |
| 5,026,459 | 6/1991 | Quang et al. | 202/158 |
| 5,057,468 | 10/1991 | Adams | 502/1 |
| 5,073,236 | 12/1991 | Gelbein et al. | 203/29 |
| 5,130,102 | 7/1992 | Jones, Jr. | 422/191 |
| 5,189,001 | 2/1993 | Johnson | 502/159 |
| 5,235,102 | 8/1993 | Palmer et al. | 562/607 |
| 5,244,604 | 9/1993 | Miller et al. | 261/97 |
| 5,277,847 | 1/1994 | Gentry et al. | 261/114.1 |
| 5,348,710 | 9/1994 | Johnson et al. | 422/211 |
| 5,366,666 | 11/1994 | Chuang et al. | 261/97 |
| 5,368,691 | 11/1994 | Asselineaw et al. | 203/29 |
| 5,387,377 | 2/1995 | Chuang | 261/97 |
| 5,407,605 | 4/1995 | Resetarits et al. | 261/98 |
| 5,431,888 | 7/1995 | Hickey et al. | 422/191 |
| 5,447,609 | 9/1995 | Yeoman et al. | 203/99 |
| 5,523,062 | 6/1996 | Hearn et al. | 422/195 |
| 5,554,329 | 9/1996 | Monkelbaam et al. | 261/98 |
| 5,593,548 | 1/1997 | Yeoman et al. | 203/96 |
| 5,632,935 | 5/1997 | Yeoman et al. | 261/114.1 |

*Primary Examiner*—Nina Bhat
*Attorney, Agent, or Firm*—C. A. Rowley

[57] ABSTRACT

An apparatus for catalytic distillation consists of alternatively a catalyst unit and an active liquid distributor tray. The catalyst unit is formed by series of troughs containing catalysts with spaces between adjacent troughs for vapor flow. The active liquid distributor tray is preferably a V-shaped tray formed with collectors that function as both a liquid distributor to deliver liquid at the appropriate locations to the underneath catalyst unit and a mass transfer device. Liquid flows down to the catalyst toughs from bottom of the sump of each collector and vapor flows up through the upper diverging walls of the collector. Packing materials may be placed on the tray or in the spaces between the troughs or both to enhance mass transfer. The catalyst troughs preferably are partitioned to cause the liquid to flow through the catalyst and to overflow the upper rim of the troughs to escape therefrom whereby the catalyst is maintained submerged.

17 Claims, 10 Drawing Sheets

APPARATUS FOR CATALYTIC DISTILLATION

FIELD OF INVENTION

The present invention relates to an apparatus for catalytic distillation, more particularly the present invention relates to an improved contactor tray and/or reaction trough for a catalytic distillation apparatus.

BACKGROUND OF THE INVENTION

Catalytic distillation is an emerging technology in which two distinct operations namely the catalytic reaction and the separation are carried out in one unit. Carrying out such a combination of steps in one unit has the potential to save energy, increase reaction conversion rate, improve product quality and reduce investment and operating costs.

The key part of developing the catalytic distillation technology is the design of internals for the catalytic distillation columns. The functions of column internals are to carry out both catalytic reaction and mass transfer simultaneously. In the past ten years, numerous patents have been awarded for the new design of the internals. They can be classified as follows:

1. Cloth Belt (U.S. Pat. No. 4,215,011). The catalyst is sealed in a cloth belt. The belt is then wrapped in open mesh knitted stainless steel wire. Liquid can penetrate into and flow out from the catalyst through the cloth. The wetted surface of the cloth belt provides the vapor-liquid interfacial area for mass transfer. The mass transfer efficiency for this kind of catalyst units is very low because of the low interfacial area. The effectiveness of the catalyst inside the belt may change from location to location because of the different liquid residence time. This reduces the overall system efficiency.

2. Catalyst Container Held on a Tray (U.S. Pat. Nos. 4,536,373, 4,439,350, and 5,447,609). One type of this catalytic distillation unit consists of a normal distillation tray and a parallel array of rectangular tubes (troughs) filled with catalyst. The tubes (troughs) are constructed by metal screen and closed at both ends. The parallel tubes (troughs) may be supported above a distillation tray but should be located in froth zone when the column is in operation. The liquid flows across the tray in either parallel or right angle to the tubes (troughs).

Another type of this unit consists of a normal distillation tray and closed porous containers containing catalyst. The containers are installed above or on the distillation tray in the tower.

The structure of these units is usually quite complex. The catalyst quantity that can be loaded is limited. It is not suitable if the catalytic reaction step is slower because the reaction rate may not be matched with mass transfer rate.

3. Packings. Random packings (U.S. Pat. Nos. 4,443,559, 5,057,468, 5,275,790, 5,262,012, and 5,189,001), e.g. Raschig rings, can be made of polymer catalyst such as ion exchange resins. The random packing in the column acts as both a catalyst and a mass transfer device. The random packing can also be made by rigid containers having a volume substantially smaller than the volume of reactive distillation column. The catalyst can be loaded into the container. Openings in the containers are provided to allow vapor and liquid passage into and out of the containers. The surfaces of the containers provide the necessary vapor-liquid contact for the distillation. The rigidity of the containers provides for the spacing of the structures and the necessary free space for the distillation.

Another type of this unit consists of a catalyst component and a resilient component intimately associated therewith. The resilient component has at least about 70% volume open space and being present with the catalyst component in an amount such that the catalyst distillation structure consists of at least 10% volume open space.

Structured Packings (U.S. Pat. Nos. 5,073,236, 5,235,102, and 5,348,710) are constructed with corrugated screen envelope with catalyst filled inside. Each envelope consists of two parallel layers of crimped screen, rough 6.25 centimeters (1 ft.) square, which are sealed at the edges. The envelopes are stacked and bound to make "bricks", which in turn are stacked to fill the column. The packing can also be in rigid, cellular monoliths or in a rigid, cellular monolith coated with a catalytically-active material.

Liquid holdup in the columns containing these internals is low. Therefore, it is not suitable to slow reaction. Like cloth belt, the effectiveness of the catalyst may change from surface to the inside because of the different liquid residence time. The cost of the internals could be very high.

4. Tray Plus Fixed Bed of Catalyst (U.S. Pat. Nos. 5,130,102, 5,368,691, 5,013,407, and 5,026,459). In these catalytic distillation units, the reactive zone consists of alternate beds of catalyst and catalyst-free distillation zones. Passage ways may be provided for a vapor phase in the fixed bed. Distillation zones contain normal distillation trays and liquid distribution plates.

The structure of these units are really complex. Liquid flow pattern may be far from plug flow. Therefore, the efficiency could be low.

5. Conventional Distillation Tray with Catalyst Placed in the Downcomer (U.S. Pat. Nos. 3,579,309, 5,277,847, 3,629,478, and 3,634,535). In these units, downcomers attached to the conventional trays are filled with catalyst which serve as a reaction zone and the trays act as a separation zone.

In these units, the catalyst loading is limited by the downcomer size. It is not suitable for slow reaction processes. The downcomer may also cause a backup of liquid onto the tray.

6. Fixed Catalyst Bed with a Distribution Element (U.S. Pat. No. 5,523,062). In this arrangement, a corrugated plate having openings only at the peaks or valleys of the corrugation is used as a distribution element for the fixed catalyst bed. The plate and fixed bed are installed alternatively. The plate has little or no contribution to mass transfer. The liquid distribution to the beneath catalyst bed can be deteriorated if the plate is not properly installed. Radial mixing of liquid in the column is minimal. All these may cause the uncertainty in the operation of such a catalytic distillation unit. For the catalyst part, same disadvantages exist as packings stated above in (3).

It will be apparent that each or the different types of units have their advantages and disadvantageous. However, none the above described systems provide structures that may easily be adapted to couple a specific reaction with a desired separation i.e. for any given catalytic reaction there is a corresponding separation rate.

BRIEF DESCRIPTION OF THE PRESENT INVENTION

It is an object of the present invention to provide an improved gas liquid contacting system.

It is a further object of the present invention to provide an improved catalytic distillation system providing better control over the catalytic reaction and enabling better coordination of the separation step to correspond with the reaction.

It is yet another object of the invention to provide a system wherein distribution and application of liquid to the reaction zone and separation zones is better controlled and more uniformly applied.

Broadly, the present invention relates to a gas liquid contactor comprising a housing defining a contact chamber having a substantial vertical longitudinal axis, at least one gas liquid contacting tray traversing said chamber, each said tray having a plurality of collector means for gas liquid contact, each said collector means having a sump means forming the lowermost portion of each collector means and gas pervious wall means diverging from said sump means to form gas liquid contact zones upstream of said sump means in the direction of liquid flow, said sump means defining a liquid condensing and retaining chamber having an inlet of sufficient area at its upstream end to permit gas to separate from foam generated by said gas liquid contact, said sump means having a bottom at its downstream side in the direction of liquid flow and liquid outlet means through said bottom, and said gas pervious wall means having a plurality of discrete passages for gas flow through said wall means to direct gas passing therethrough into contact with said liquid flowing in countercurrent thereto.

Preferably said gas pervious wall means define side wall means of said collector means said side wall means slope upward in said upstream direction and lateral from said inlet to said sump means.

Preferably, said side wall means terminate at their ends remote from said sump to define a portion of a periphery of said collector means and wherein peripheries of adjacent said collectors means in each said tray are in substantially abutting relationship.

Preferably, said collector means will each be substantially symmetrical relative to a longitudinal axis and said longitudinal axes of said collectors in each said tray are substantially parallel.

Broadly the invention also relates to an apparatus for catalytic distillation comprising a housing having a substantially vertical axis, a plurality of gas liquid contacting trays traversing said housing at locations longitudinally spaced relative to said housing, a plurality of troughs mounted between a pair of adjacent of said trays, said troughs being spaced apart to define gas flow passages therebetween, each of said troughs having a liquid inlet and a liquid outlet and means for directing liquid from said tray immediately thereabove into said liquid inlet, a passage leading from said liquid inlet to said outlet, a catalyst charge in said passage through which said liquid must flow to pass from said inlet to said outlet, said means for directing liquid into each of said inlets, said means for directing being positioned so that substantially all of said liquid from said tray immediately thereabove is distributed to flow into said inlets of said plurality of troughs, said plurality of troughs being axially spaced from said adjacent said trays.

Preferably, said means for directing comprises cap means positioned above each of said gas passages to deflect liquid from entering said gas passages and direct such liquid into adjacent inlets of said troughs while diverting gas flowing upwardly from said passages.

Preferably, said passages will be substantially parallel to said longitudinal axis of said housing.

Preferably, said tray immediately thereabove will be formed with a plurality of collector means for gas liquid contact, each said collector means having a sump means forming the lowermost portion of each collector means and gas pervious wall means diverging from said sump means to form gas liquid contact zones upstream of said sump means in the direction of liquid flow, said sump means defining a liquid condensing and retaining chamber having an inlet of sufficient area at its upstream end to permit gas to separate from foam generated by said gas liquid contact, said sump means having a bottom at its downstream side in the direction of liquid flow and liquid outlet means through said bottom, and said gas pervious wall means having a plurality of discrete passages for gas flow through said wall means to direct gas passing therethrough into contact with said liquid flowing in countercurrent thereto.

Preferably each said troughs has a longitudinal axis and wherein said collector means is substantially symmetrical relative to its longitudinal axis and said longitudinal axes of said collectors in each said tray are substantially parallel.

Preferably, said passage means includes an infeed section leading from said inlet to a bottom of said trough and at least one return section through which said liquid means was passed to reach said outlet and wherein each said trough has an upper rim and said outlet of each said trough is formed by upper rim forming a weir over which said liquid must flow on leaving said trough.

Preferably, said weir is formed by discrete spaced V-shaped outlets through which liquid flows from said trough.

Preferably, packing is provided in said gas flow passages between said troughs.

Preferably, packing is provided between bottoms of said troughs and the top of said tray immediately therebelow.

Preferably, flow passage means will interconnect said troughs between said adjacent pair of said trays to ensure liquid levels in all of said troughs between said pair of said trays are substantially the same.

BRIEF DESCRIPTION OF THE DRAWINGS

Further features, objects and advantages will be evident from the following detailed description of the preferred embodiments of the present invention taken in conjunction with the accompanying drawings in which.

DESCRIPTION OF THE PREFERRED EMBODIMENTS

For a detailed description of the preferred embodiments, the reader is referred to the attached figures wherein like components are given like numbers for ease of reference.

Figure 1:
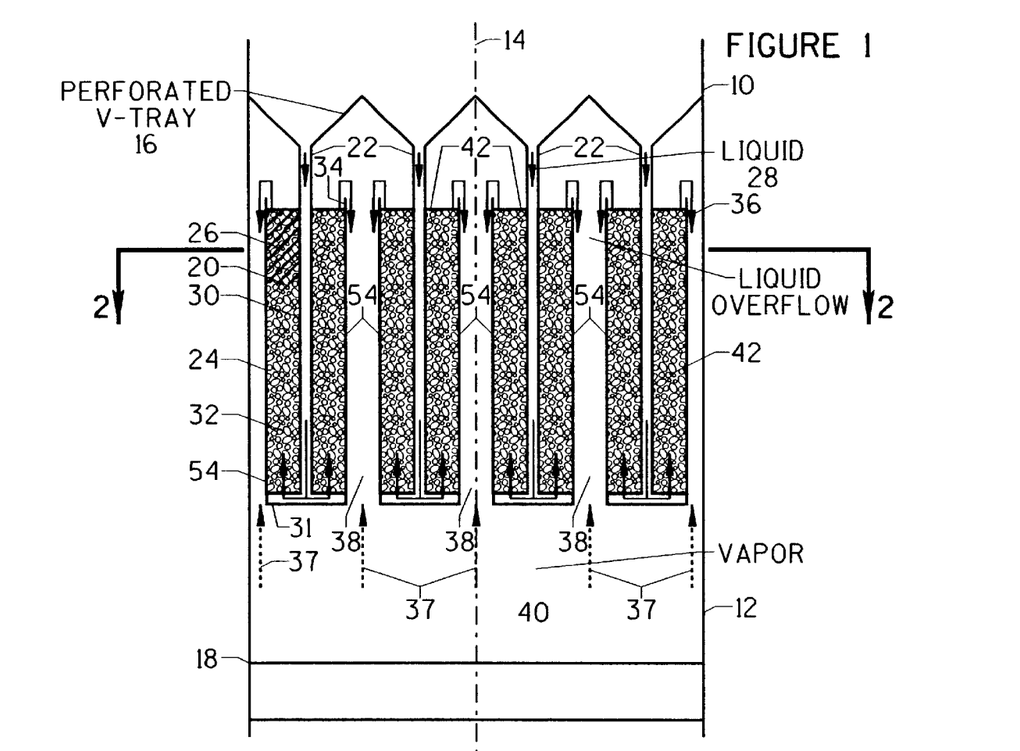
FIG. 1 is a schematic cross-sectional view of an apparatus incorporating the present invention.

FIG. 1 show a portion of a contactor/reactor apparatus 10 including a reactor and contacting stages incorporating the present invention. The contactor 10 comprises an outer housing 12 having a substantially vertical longitudinal axis 14 so that liquid which is introduced at the top of a stage in the contactor/reactor 10 flows down through the stage and thus down through the housing or chamber 12 toward its bottom.

In the illustrated arrangement in FIG. 1 there is shown an operating section of a catalytic distillation system composed of a pair of adjacent gas liquid contact trays 16, and 18 namely a top tray 16 and a bottom tray 18 and a reaction unit 20 therebetween.

The trays 16 and 18 are shown as the V-shaped form of gas liquid collector tray of the present invention and will to be described in more detail below. In the illustration the collector trays 16 and 18 have been shown schematically as being substantially V-shaped collectors that extend the full width of the tray i.e. across the housing 12 with the longitudinal axes (defined by the apexes of the V-shapes) of the collectors in each tray substantially parallel, but with the longitudinal axes of collectors of adjacent trays preferably arranged to be substantially perpendicular, i.e. the longitudinal axes of the V of the tray 16 are parallel and are substantially perpendicular to the longitudinal axes of the V shaped collectors or the tray 18.

As will be described in more detail hereinbelow, the trays 16 and 18 function as gas liquid contacting (mass transfer) trays and as a collector to collect the liquid on the tray in specific locations and direct it into the liquid inlet of the reactor unit 20 immediately therebelow, i.e. the upper tray 16 will direct the liquid collected in the sump of the collector via the pipes 22 into the inlets (which also are defined by the pipes 22) to the catalyst containing troughs 24. These troughs 24 are formed with an U shaped passage 26 which directs liquid to flow as indicated by the arrows 28 down the passage 30 to the bottom 31 of the trough 24 and then up through the up passage 32 formed in the illustrated arrangement by a pair outside passages 32 one on each side of the down passage 30 to the trough outlet or rims 34 over which the liquid flows is indicated by the arrow 36 and overflow from the trough(s) 24 and pass into and then through the adjacent gas passage 38 into this free space 40 immediately above the lower tray 18. The liquid is thus distributed over the surface of the lower tray 18 underlying the passages 38. This liquid is then further distributed or redistributed on and by the upper surface of the tray 18 and is subject to gas liquid contact which will generally cause frothing as will be described below. The liquid (froth) above the surface of the tray 18 is again collected in discrete pools at the bottom of the sumps of the collectors in the tray 18 (as will be described below) and passed then passed via pipes 22 to the trough 24 therebelow. The liquid and gas are separated in the sumps.

Figure 3:
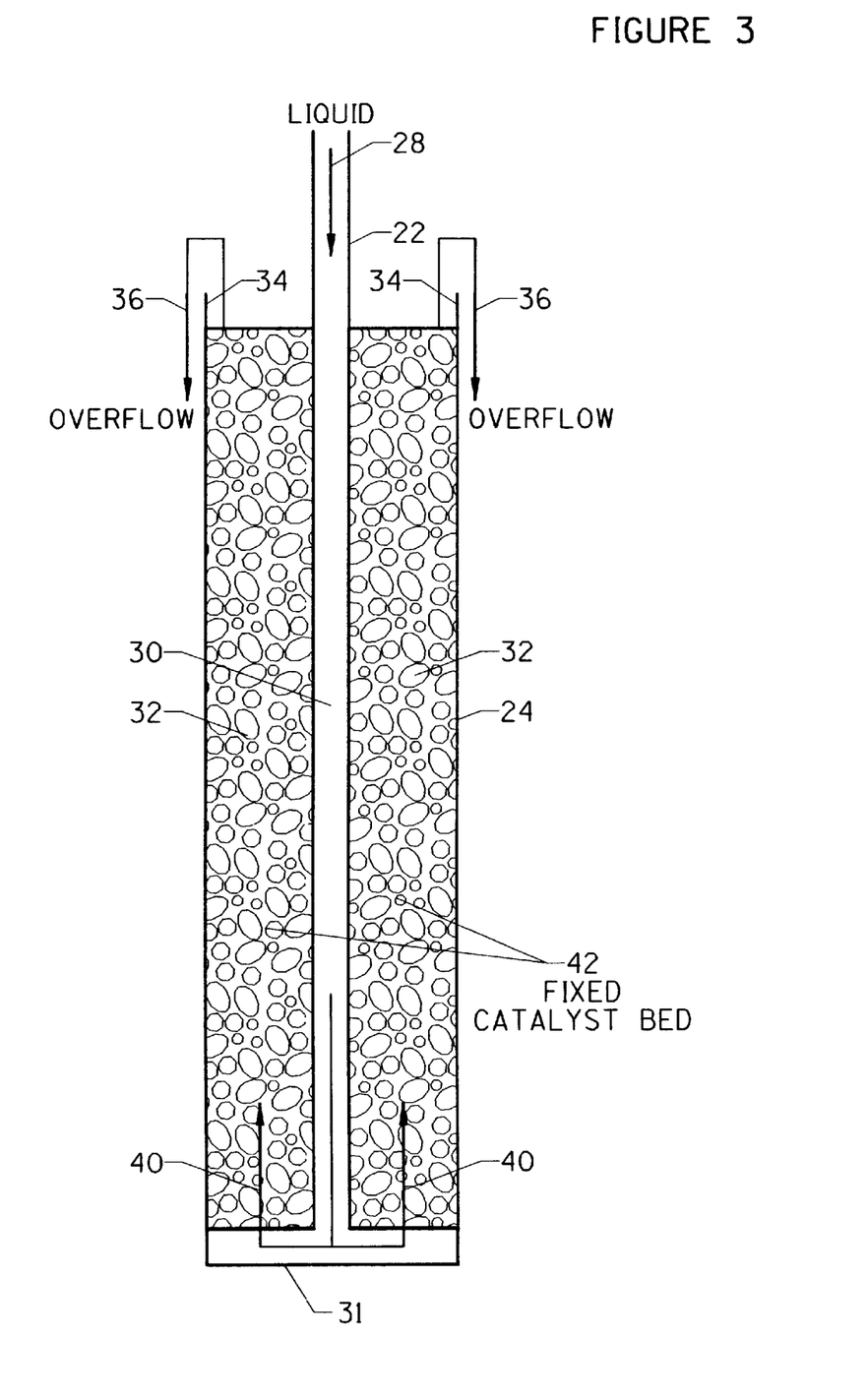
FIG. 3 is the side view of one form of trough of the catalyst unit and liquid flow.

As more clearly shown in FIG. 3, the outlet 34 over which the liquid flows as an overflow indicated by the arrow 36, receives liquid entering as indicated by the arrow 28 passing down the pipe or other directing means 22 into the down passage 30 and then up as indicated by the arrows 40 through the up passage(s) 32 which preferably will contain a fixed catalyst bed as indicated by the reference numeral 42 through which the liquid must pass.

It will be apparent that with this system, for the liquid to leave the trough 24, it must first pass to the bottom 31 and then as indicated by the arrow 40 up passage 32 to the outlet formed by the rim 34 at the top of the trough 24. It will be apparent that with this arrangement, for liquid to exit the trough 24, the trough must be filled to a height higher than the lowest portion of the rim 34 which forms a weir over which the liquid must flow to escape from the trough 24 and thus, the liquid must pass through substantially the full height of the catalytic bed 42 before leaving the reaction trough 24.

Figure 4:
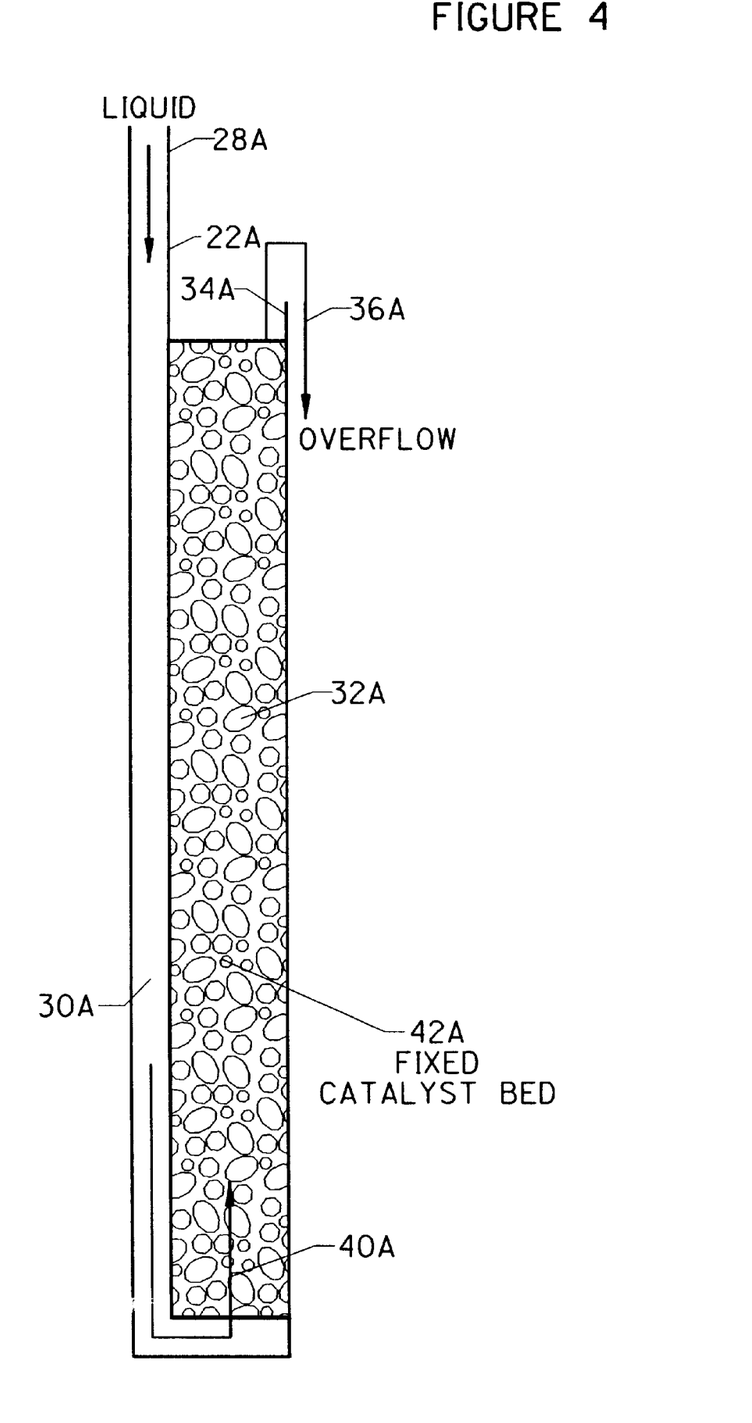
FIG. 4 is another form of trough of the catalyst trough and liquid flow.

In the arrangement shown in FIG. 4, a single outflow passage 32A contains a fixed catalyst bed 42A has a single overflow rim or weir 34A. In this system, the passage 32A is equivalent to the two parallel passages 32 of the FIG. 3 and one embodiment.

Figure 5:
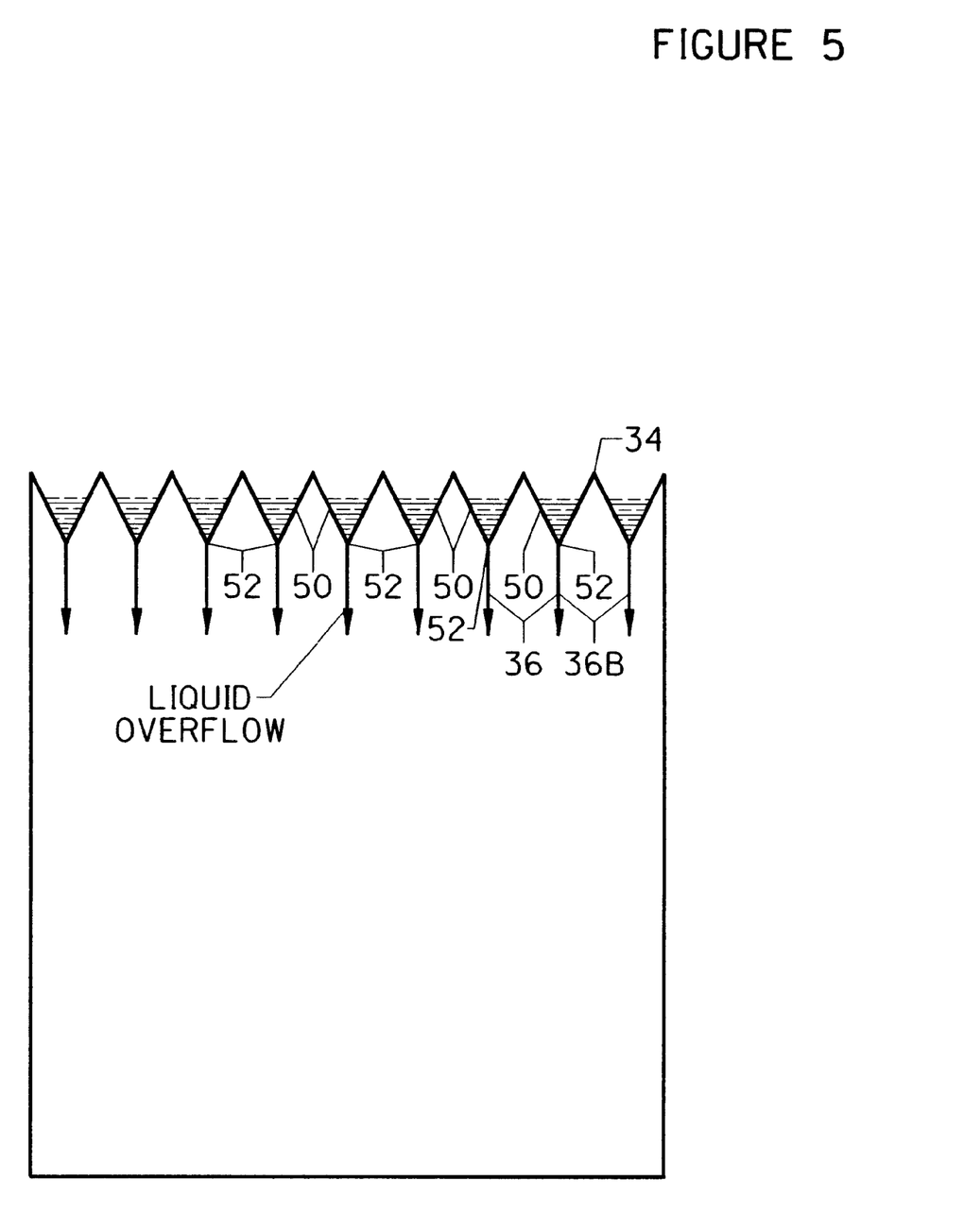
FIG. 5 is the side view of a preferred form of liquid overflow plate from the troughs.

Turning to FIG. 5, the rim 34 may be formed with V shaped slots 50 each with a bottom apex 52 forming the weir over or through which the liquid flows as indicated by the arrows 36A.

Figure 2:
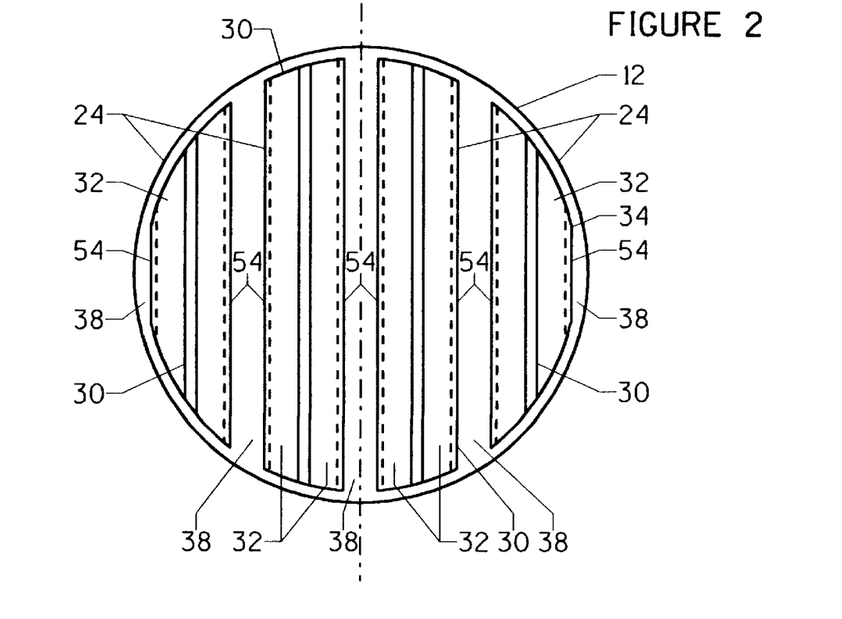
FIG. 2 is a section on line 2—2 of FIG. 1.

In each case the liquid flows over the rim 34 (or 34A) or out the slots 50 and down the outside surface 54 of the trough 24 by facilitate gas liquid contact in the passage 38 (see FIGS. 1 and 2), i.e. the gas flow as indicated by the dash line 37 in FIG. 1, passes up through the passages 38 and sweeps the walls 54 to provide good contact between the liquid flowing down the walls 54 and the gas flowing upward through the passages 38.

Figure 6:
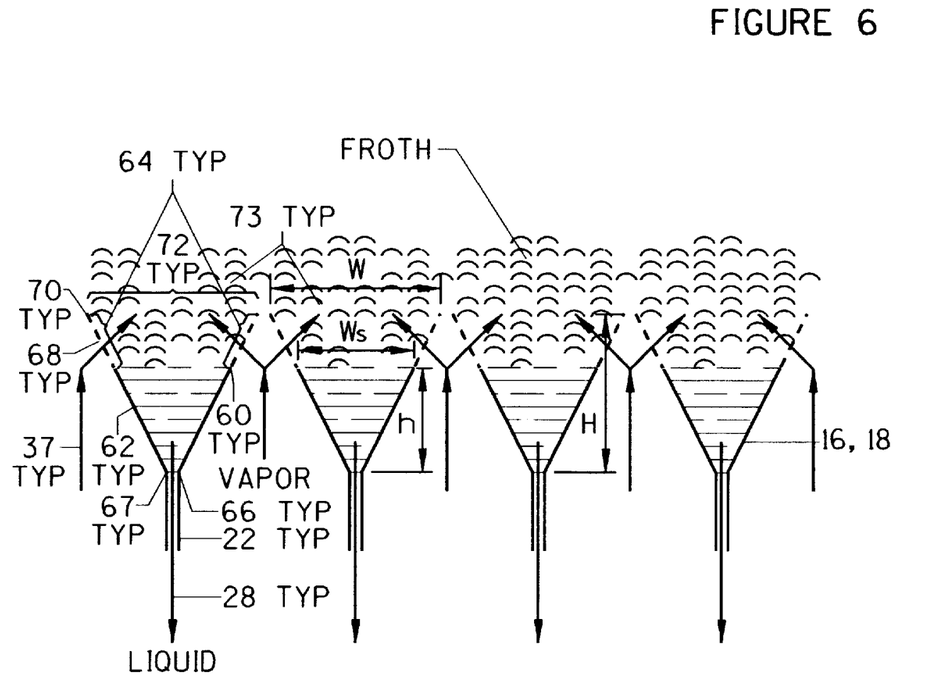
FIG. 6 is a schematic side view of a tray with V shaped collectors for liquid distribution to the trough containing the catalyst bed immediately therebelow and for mass transfer.
Figure 7:
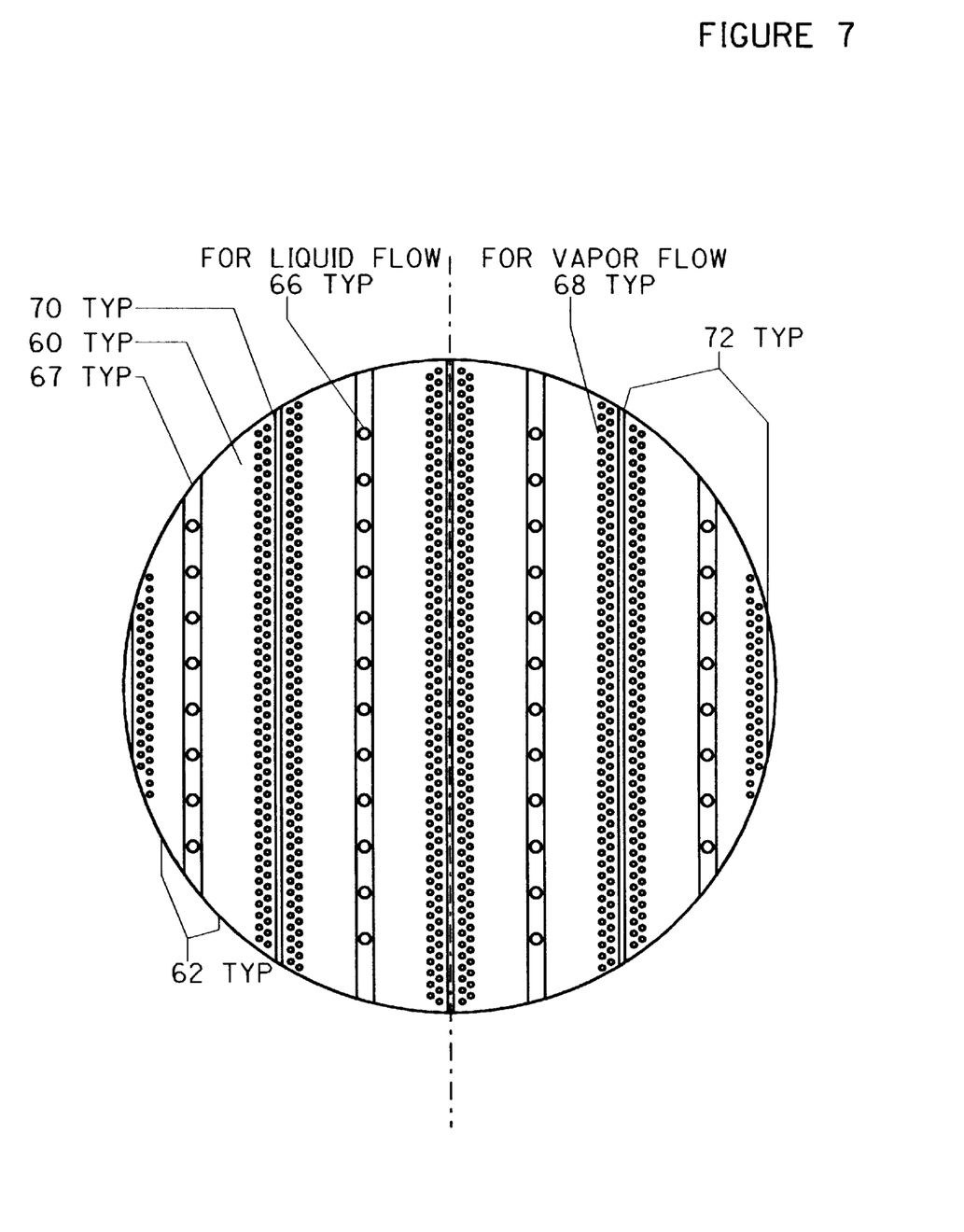
FIG. 7 is the top view of the V-shaped tray showing the positioning of the gas passages in the sloping walls of the collectors and the outlets at the bottom of the sumps.

The trough 16 or 18 or the like V-shaped version of the present invention are illustrated in more detail in FIGS. 6 and 7. It will be noted that the V-shaped version of the trays 16, 18, etc. are formed by a plurality of side by side collectors 60, each having a sump portion 62 and a pair of gas pervious diverging side wall portions 64. The gas permeable portions 64 preferably slope upward and laterally one from each top edge of the sump portion 62 (in some cases there may be a side wall extending from one side of a sump only). A plurality of liquid outlets 66 a formed through the bottom 67 of the sump 62 to drain liquid therefrom.

The gas pervious sidewalls 64 are each formed with a plurality of passages 68 to pass gas upward therethrough as indicated by the arrow 37 for contact with the liquid passing over the upper surface of the collector 60. This flow of gas or vapor through the apertures 68 caused in the normal operation of the equipment, formation of a froth as generally indicated at 73 over the top of the bed 16 or 18 i.e. above the collectors 60. This froth is converted or coalesces to a liquid in the sumps 62 and form a pool of liquid in each sump 62.

As described above the outlets 66 through the bottom 67 of each of the sumps connect with a tube or pipe 22 that delivers liquid into the inlet i.e. to the down passage 30 of the catalyst trough 24 immediately therebelow The outer peripheries or rims 70 of the diverging side walls 64 define an inlet end or intake end 72 of each of the collectors 60 into which the liquid from the preceding reaction stage 20 passes. The adjacent peripheries i.e. top edges 70 of adjacent collectors 60 are in closely spaced as illustrated so that they are in substantially abutting relationship so that substantially the whole upper surface area of the trays 16, 18 is formed as inlets to adjacent collectors 60.

It will be apparent that as the liquid flows into the collectors 60, it is contacted by the gas flowing through the apertures 68 as indicated by the arrows 37 to form the froth 73 and then the liquid eventually is received in the sump portion 62 between the diverging side walls 64 and is funneled down into the outlets 66 and then directed via pipe 22 into the inlet end of the catalytic chamber 24 immediately therebelow.

It can be seen from FIG. 6 that the liquid flow outlets 66 lead into to the pipe 22 which may be a single discrete pipe collecting from all the hole of a given collector or individual pipes or tubes 22 one from each hole 68 leading to the center pipe or passage.

The gas apertures 68 have been shown as arranged in substantially parallel rows in FIG. 7, but they may be arranged in any suitable pattern.

Preferably, when the V-shaped collectors are used the height H of each of the collectors 60 (from the bottom 67 to the rim 70) is between about 5 and 12.5 centimeters (2 to 5 inches) and the width W of the open mouth inlet end 72 of each of the collectors 60 will be in the range of 5 to 50 centimeters (2 to 20 inches). The opening or inlet to the sumps 62 will have a width $W_s$ sufficiently wide to ensure that the gas forming the foam with the liquid may freely escape upwardly and will generally be about ⅜ to ⅝ that of the width W.

The height h of the sump portion 62 is chosen based on the height to the bottom 31 of the trough 24 to which it is directing liquid to provide a head sufficient for a flow out from the bottom of sump 60 under the operating vapor and liquid loading of the system. (Flow through the system is influenced by the size and number of the openings 68 which contribute to the tray pressure drop and by the pressure drop across the catalyst bed).

Generally the height H will be equal to about 2h and the passages 68 will commence half way up the collector 60 and will extend between the top of the sump 62 and the top 70 of the collector 60. In other words, the apertures 68 for gas flow will be confined to the diverging walls 64 of upper portion of the collect 60 which preferably will be the top ½ of the height or depth of the collector 60.

The open areas for vapor flow, i.e. the open areas formed by the gas passages 68 will occupy between about 10 and 40% of the surface area of the walls 64 i.e. upper portion of the collector 60 in which they are positioned whereas the total area of the liquid outlets 66 relative to the strip of area along the bottom 67 of the sump 60 of a width equivalent to the diameter of the hole 66 will be between 0.1 and 5%.

The hole diameter for the hole 68 and 60 will be in the range of about 3 to 15 millimeters (⅛ of an inch to ½).

The holes 68 are preferably positioned over the area of the walls 64 at the upper end (upstream end in the direction of liquid flow) of the collectors 60 which they are to be allocated in uniformly spaced relationship and will be sufficiently small so that the air flow therethrough or gas flow therethrough impede the flow of liquid but generally ensures that all of the liquid is substantially prevented from passing through the orifices 68 and must proceed to the bottom of the sump 62 to leave the collector 60 via the outlet 66.

Obviously the trays including the sizes of the various portions 62 and 64, number and size of passages 66 and 68 etc. must be designed in known manner to properly accommodate the flows through the system and attain the required gas liquid contact. Substantially only gas is intended to flow through the apertures 68 thus their size must be correlated with the rate of gas flow to obtain this intended result. Similarly the size of the troughs 24 will be selected using conventional engineering to provide the required time of contact with the catalyst in the bed 42 to obtain the desired reaction i.e. length of travel of the liquid through the bed 42 and the rate of flow will be designed to ensure the appropriate time of contact to obtain the required reaction in the reaction zone 20.

The main purpose of the collectors 60 is to collect the liquid in discrete pools i.e. in the sumps 62 so it may then be delivered via the pipes 22 to the inlet of next lower trough 24 immediately therebelow. It is another important purpose of the collectors to better ensure uniform distribution of the liquid over the upper surface of the tray(s) 16, 18, etc., and further to better ensure that the depth of the liquid is maintained shallow over the surface of the walls 64 and thereby improve gas liquid contact on the trays. Thus it is important that separate sumps 62 be provided in reasonably close spaced relationship i.e. position the outlets 66 between about 5 and 50 centimeters apart (2 to 20 inches) apart and thus, the adjacent top edges of adjacent sumps 60 about 2.5 to 25 centimeters (1 to 10 inches) apart.

The use of the V-shape cross sections to the collectors 60 is preferred but is not essential. The V shape may be used to provide a horizontal component to the gas flow to aid in froth formation over the top of the sumps 62.

Figure 6A:
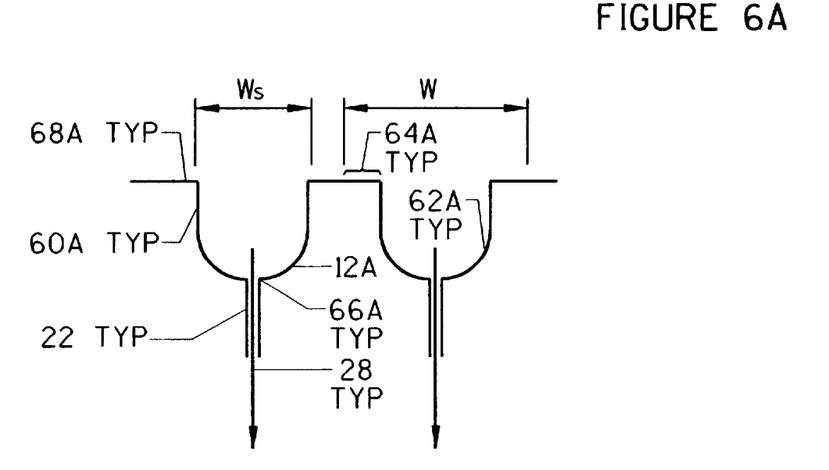
FIG. 6A is a schematic side view similar to FIG. 6 but showing of a tray with modified collector constructed in accordance with the present invention.

As illustrated in FIG. 6A wherein like parts to the previously described embodiment have been indicated by the same reference numbers followed by the letter A collectors 60A are formed by gas pervious walls 64A diverging from the sump 60A which in this embodiment is shown as substantially U-shaped. Walls 64 may be substantially horizontal as indicated or preferably slope downward toward the inlet of the sump 62A.

Also, it is preferred but it is not essential that the slopes of the gas pervious walls 64 or 64A on opposite sides of a sump 62, 62A be the same the slope relative to the vertical axis 14. Similarly though it is preferred to simplify construction by using the V-shaped cross section collectors the sumps 62 or 62A need not be V-shaped or U-shaped in cross section they need only deliver the liquid to the outlets 66 and thus could for example have essentially vertical side walls and a concave (viewed from inside the sump) bottoms to direct the liquid to the outlets 66. Obviously depending on the depth (measured in the direction of the height h) of the liquid in the sump 62 the shape of the bottom 67 may not have any effect. As above indicated the volume of the sump is designed to ensure substantially complete separation of the liquid from the gas in the sump 62.

It is also possible to provide an operable system using a conventional dual flow trays in place of the collector type trays described above and that may be used (see FIG. 8). In this embodiment, the housing 12 is traversed by conventional dual flow trays 80 through which gas travels in one direction and liquid in the other (flow of gas is indicated by the dotted lines 90 and that of the liquid via the solid arrows 92). Generally a froth 82 is formed above the tray 80. In this arrangement, the catalytic unit 84 is formed by a plurality of discrete tubes or passages 86 with gas passages 88 therebetween,. Each of the tubes 86 has an inlet end 94 and an outlet end 96 covered by a metal screen 98 to retain the catalyst within the tube 86.

Figure 8:
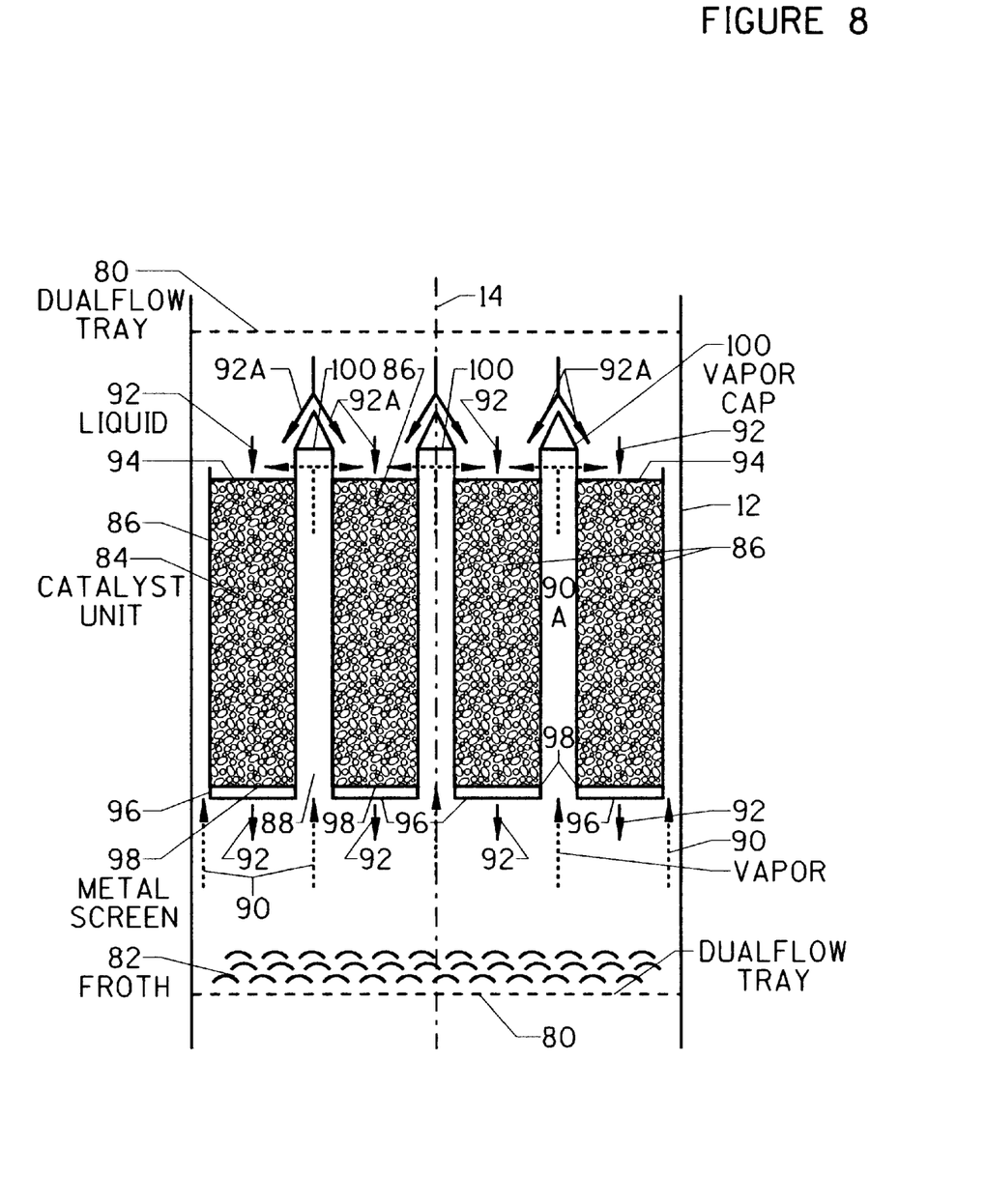
FIG. 8 is a schematic cross-section of another form of the present invention and incorporating conventional dual flow trays in place of the collector trays of the present invention.

To prevent the liquid from flowing directly into the gas passages 88 and to direct the liquid from the upper tray into the inlet 94, vapor caps 100 cover substantially the full cross sectional area of the passages 88 and preferably project slightly laterally therebeyond of the passages 88 so that the liquid from the upper dual flow tray 80 is deflected as indicated by the arrow 92A to flow into the inlets 86 and the gas from the passages 88 is deflected as indicated by the arrows 90A to flow side ways and tend to entrain the liquid represented by the arrows 92 into position over the inlets 94.

Similarly, the through flow units 84 could be used with V shaped trays described herein above.

The flow through units 84 which consist in the tubes 86 are not preferred and their use will normally be confined to contactor reactors 10 of relatively small size e.g. contactors 10 having an inside diameter of about 50 centimeters or less.

Figure 9:
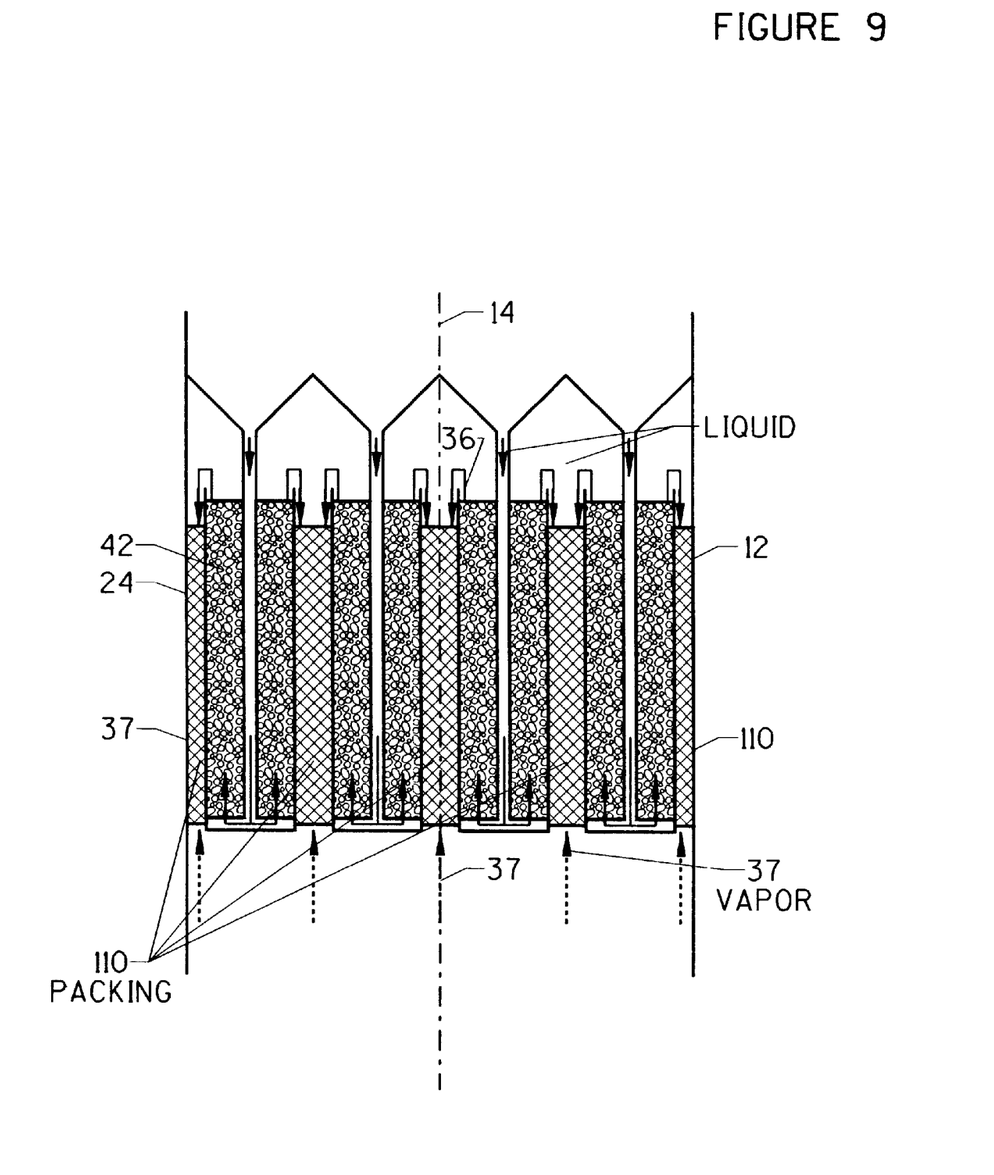
FIG. 9 is a schematic cross-section of the invention in which inert packing are inserted into the spaces between catalyst troughs for mass transfer.

FIG. 9 show the unit essentially the same as FIG. 1 but with packing 110 interposed between adjacent troughs 24. The packing 110 improves the contact between liquid and gas as they flow currently through the packing.

Figure 10:
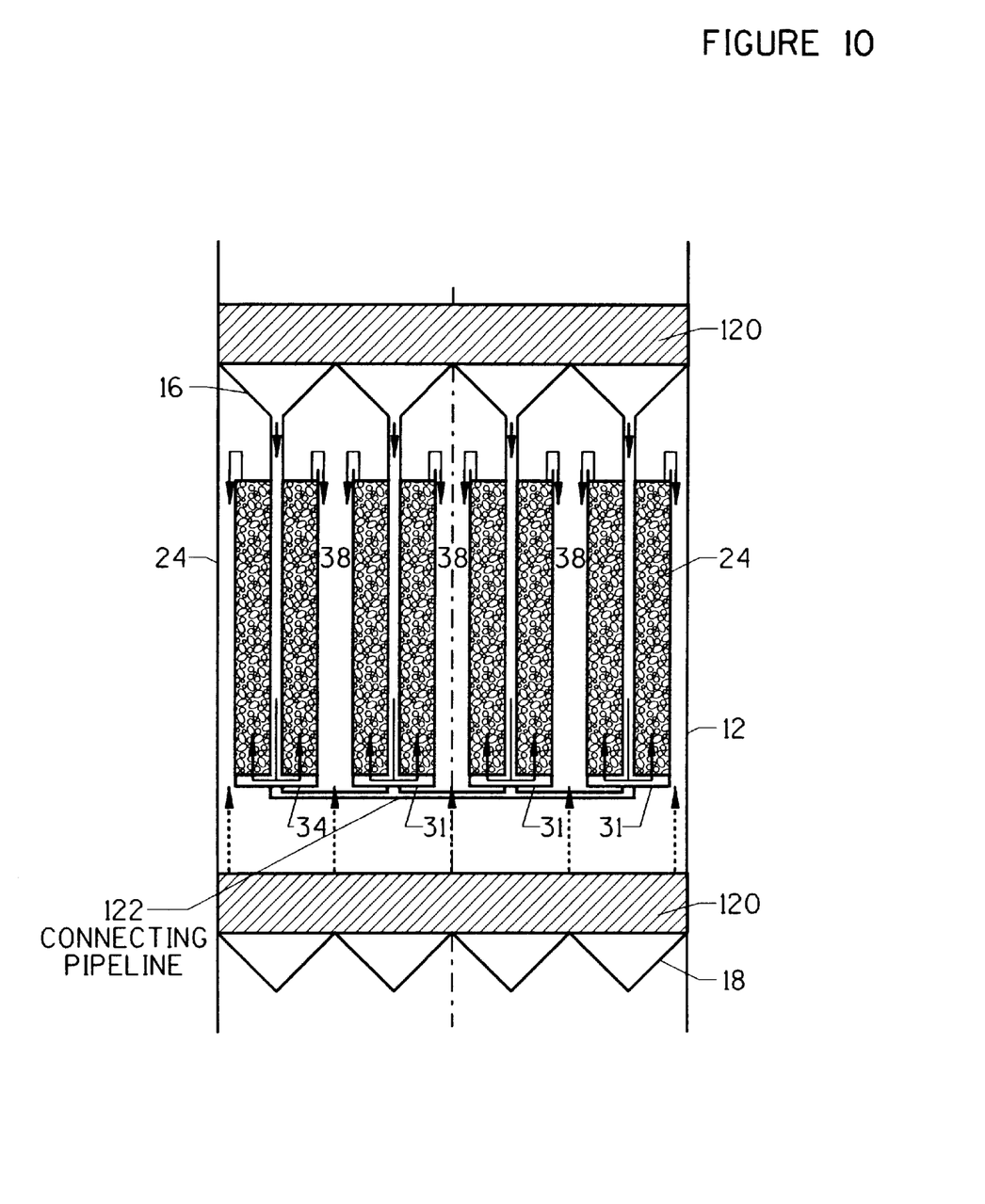
FIG. 10 is a schematic section showing a pipeline which connects the bottom of each trough and a packing overlying the tray.

FIG. 10 shows a further embodiment of the present invention. The main difference being the addition of a packing 120 that extends over the full cross sectional area of the housing 10 immediately above each of the trays 16 and 18 and wherein the longitudinal axes of its collectors in both trays 16 and 18 substantially parallel to each other.

The packings may be of the random or structured type.

The arrangement of FIG. 10 further includes a series of pipes 122 interconnecting each of the troughs 24 in a manner to ensure the liquid levels in each of the troughs 24 is essentially the same i.e. they are at a common height to better ensure uniform flow of the liquid through the troughs 24 into the passages 38.

In all of the above arrangements, the troughs 24 have been substantially rectangular in shape and extend with parallel side walls. It is also possible to make the shape of these troughs significantly different. For example, they may be shaped with circular cross sections and be arranged as concentric rings with gas passage forming spaces therebetween, each of the rings having their axis substantially concentric with the central axis 14. Obviously the collectors 60 with the concentric arrangement of troughs will have their shapes correspondingly arranged, i.e. in concentric circles.

EXAMPLE

Figure 11:
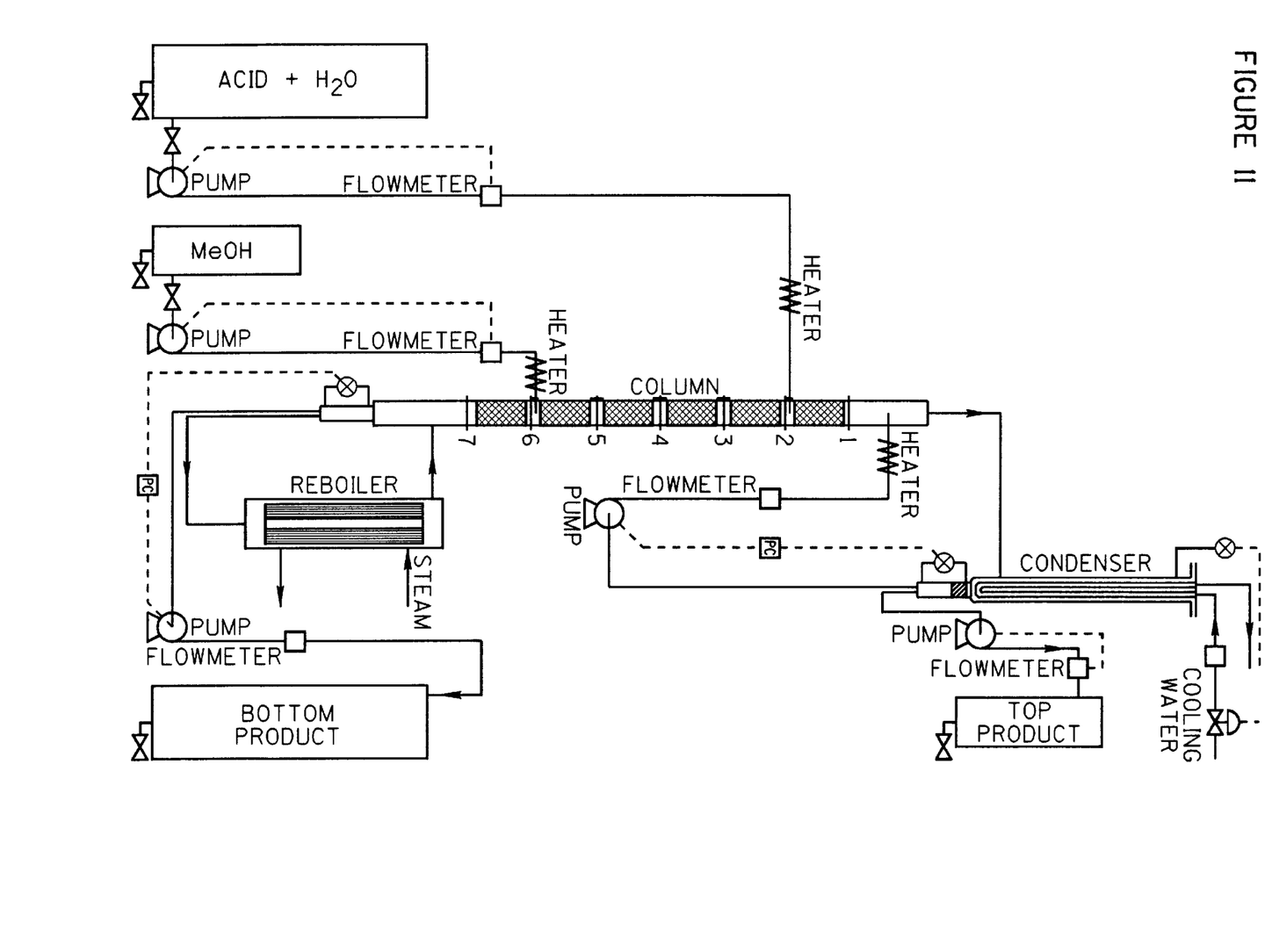
FIG. 11 is a schematic illustration of a catalytic distillation system incorporating the present invention.

The present invention was applied in an apparatus having a flow system as indicated at FIG. 11. In this particular arrangement which is similar to that shown in FIG. 8, the column 200 has a diameter of 100 millimeters (mm.) that included seven trays and six catalyst unit. The catalyst units are constructed with two concentric troughs filled with catalyst and a vapor channel is located between the two concentric troughs. The height of each catalyst bed is 90 mm. and each trough is positioned 100 mm below the tray 16 thereabove.

Tray spacing is 220 millimeters. The perforations of the dual flow tray are 4.8 mm in diameter and are uniformly distributed over and occupy 12% of the column cross sectional area.

Methanol and a mixture of acetic acid/water containing 6% of acetic acid were fed to the column at rates of 30 grams per minute and 140 grams per minute respectively. 24 grams per minute of product was withdrawn from the column top and the rest was discharged from the column bottom. The reflux ratio was 10.2. The column was operated under atmospheric pressure. Temperatures in the column ranged from 64.6 to 95.3° C. and 58% by weight of acetic acid was converted to methyl acetate.

Having described the invention, modifications will be evident to those skilled in the art without departing from the scope of the invention as defined in the appended claims.

We claim:

1. A gas liquid catalytic distillation apparatus comprising a housing defining a contact chamber having a substantially vertical longitudinal axis and a liquid inlet and gas outlet adjacent to its upper end and a gas inlet and liquid outlet adjacent to its lower end, at least one gas liquid contacting tray traversing said chamber, each of said tray having a plurality of collector means for gas liquid contact, each said collector means having a sump means forming the lowermost portion of each collector means and gas pervious wall means diverging from said sump means to form gas liquid contact zones upstream of said sump means in the direction of liquid flow to said sump means, said sump means defining a liquid condensing and retaining chamber having a width so that sufficient open area is provided at its upstream end to permit gas to separate from foam generated by said gas liquid contact, said sump means having a bottom end at its downstream side in the direction of liquid flow and liquid outlet means at said bottom end, and said gas pervious wall means having a plurality of discrete passages for gas flow through said gas pervious wall means to direct gas passing therethrough into contact with said liquid flowing in over said gas pervious wall means to said sump means, said wall means and said sump means of said collector means being positioned in said contacting tray to distribute and direct said liquid to flow along said tray and into said sump means, a plurality of troughs mounted between and in spaced relationship with a pair of adjacent contacting trays, each of said troughs being positioned directly below one of said sump means in said contacting tray immediately thereabove, said troughs being laterally spaced apart to define gas flow passages therebetween, each of said troughs defining a confined passage for liquid flow having a liquid inlet at its upper end and a liquid outlet at its other end, means for directing liquid from said outlet of one of said sump means immediately thereabove directly into said liquid inlet of said confined passage in said trough immediately therebelow, a catalyst charge in said confined passage, said confined passages in said plurality of troughs between a pair of adjacent contacting trays forming substantially the sole path for liquid movement between said pair of adjacent contacting trays so that substantially all of said liquid from said contacting tray immediately above flows from said liquid outlets in said sump means into said inlets of said plurality of troughs immediately therebelow, through said passages for liquid and said catalyst out and toward said contacting tray immediately therebelow.

2. A gas liquid contactor catalytic distillation apparatus as defined in claim 1 wherein said gas pervious wall means of each of said collector means slope upward in said upstream direction and laterally from said sump means of its said collector means.

3. A gas liquid contactor catalytic distillation apparatus as defined in claim 2 wherein said gas pervious wall means terminate at their ends remote from said sump to define a portion of a periphery of its said collector means and wherein peripheries of adjacent said of collector means in each said contacting tray are in substantially abutting relationship.

4. A gas liquid catalytic distillation apparatus as defined in claim 3 wherein each said collector means is substantially symmetrical relative to a longitudinal axis and said longitudinal axes of said collectors in each said tray are substantially parallel.

5. A gas liquid catalytic distillation apparatus as defined in claim 2 wherein each said collector means is substantially symmetrical relative to a longitudinal axis and said longitudinal axes of said collectors in each said tray are substantially parallel.

6. An apparatus for catalytic distillation as defined in claim 2 wherein said confined passage includes an infeed section leading from said liquid inlet at its upper end to a bottom of said trough and at least one return section extending from said bottom towards said upper end and through which said liquid must pass to reach said liquid outlet and wherein each said liquid outlet of each said trough is formed by an upper rim on its said trough forming a weir over which said liquid must flow on leaving said trough.

7. An apparatus for catalytic distillation as defined in claim 6 wherein said weir is formed by discrete spaced V-shaped outlets through which liquid flows from said trough.

8. An apparatus for catalytic distillation as defined in claim 2 wherein flow passage means interconnect said troughs between an said adjacent pair of said trays to ensure liquid levels in all of said troughs between said pair of said trays are substantially the same.

9. A gas liquid catalytic distillation apparatus as defined in claim 1 wherein said each collector means is substantially symmetrical relative to a longitudinal axis and said longitudinal axes of said collectors in each said tray are substantially parallel.

10. An apparatus for catalytic distillation as defined in claim 1 wherein said means for directing comprises cap means positioned above each of said gas passages to deflect liquid from entering said gas passages and direct such liquid into adjacent inlets of said troughs while diverting gas flowing upwardly from said passages.

11. An apparatus for catalytic distillation as defined in claim 1 wherein said confined passages have their longitudinal axes substantially parallel to said longitudinal axis of said contact chamber.

12. An apparatus for catalytic distillation as defined in claim 1 wherein said tray immediately thereabove will be formed with a plurality of collector means for gas liquid contact, each said collector means having a sump means forming the lowermost portion of each collector means and gas pervious wall means diverging from said sump means to form gas liquid contact zones upstream of said sump means in the direction of liquid flow, said sump means defining a liquid condensing and retaining chamber having an inlet of sufficient area at its upstream end to permit gas to separate from foam generated by said gas liquid contact, said sump means having a bottom at its downstream side in the direction of liquid flow and liquid outlet means through said bottom, and said gas pervious wall means having a plurality of discrete confined passages for gas flow through said wall means to direct gas passing therethrough into contact with said liquid flowing in countercurrent thereto and wherein said means to direct comprises a pipe means for conducting liquid from said liquid outlets through said bottom of said sump directly into said inlet of said trough immediately therebelow.

13. An apparatus for catalytic distillation as defined in claim 1 wherein said confined passage includes an infeed section leading from said liquid inlet at its upper end to a bottom of said trough and at least one return section extending from said bottom towards said upper end and through which said liquid must pass to reach said liquid outlet and wherein each said liquid outlet of each said trough is formed by an upper rim on its said trough forming a weir over which said liquid must flow on leaving said trough.

14. An apparatus for catalytic distillation as defined in claim 13 wherein said weir is formed by discrete spaced V-shaped outlets through which liquid flows from said trough.

15. An apparatus for catalytic distillation as defined in claim 1 wherein a packing is provided in said gas flow passages between said troughs.

16. An apparatus for catalytic distillation as defined in claim 1 wherein a packing is provided between bottoms of said troughs and top of said tray immediately therebelow.

17. An apparatus for catalytic distillation as defined in claim 1 wherein flow passage means interconnect said troughs between an said adjacent pair of said trays to ensure liquid levels in all of said troughs between said pair of said trays are substantially the same.

* * * * *